United States Patent
Shahraray et al.

(10) Patent No.: US 9,066,143 B2
(45) Date of Patent: Jun. 23, 2015

(54) METHOD AND APPARATUS FOR DISTRIBUTED DISPLAY MONITORING

(75) Inventors: Behzad Shahraray, Holmdel, NJ (US); Andrea Basso, Marlboro, NJ (US); Lee Begeja, Gillette, NJ (US); David C. Gibbon, Lincroft, NJ (US); Zhu Liu, Marlboro, NJ (US); Bernard S. Renger, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 706 days.

(21) Appl. No.: 12/625,858

(22) Filed: Nov. 25, 2009

(65) Prior Publication Data
US 2011/0126223 A1    May 26, 2011

(51) Int. Cl.
| | |
|---|---|
| H04N 7/16 | (2011.01) |
| H04H 60/33 | (2008.01) |
| H04H 60/56 | (2008.01) |
| H04N 21/475 | (2011.01) |
| H04N 21/442 | (2011.01) |
| H04N 21/454 | (2011.01) |
| H04N 21/45 | (2011.01) |

(52) U.S. Cl.
CPC ..... *H04N 21/4755* (2013.01); *H04N 21/44218* (2013.01); *H04N 21/4532* (2013.01); *H04N 21/4542* (2013.01)

(58) Field of Classification Search
USPC .................................................. 725/28, 30
See application file for complete search history.

(56) References Cited

U.S. PATENT DOCUMENTS

| | | | |
|---|---|---|---|
| 5,382,983 | A | 1/1995 | Kwoh et al. |
| 5,548,345 | A | 8/1996 | Brian et al. |
| 5,828,402 | A * | 10/1998 | Collings ......................... 725/28 |
| 5,973,683 | A * | 10/1999 | Cragun et al. ................. 715/719 |
| 6,025,869 | A | 2/2000 | Stas et al. |
| 2002/0184631 | A1 | 12/2002 | Cezeaux et al. |
| 2004/0015985 | A1 * | 1/2004 | Kweon .......................... 725/30 |
| 2005/0060740 | A1 * | 3/2005 | Stecyk .......................... 725/28 |
| 2005/0240960 | A1 | 10/2005 | Nagtzaam |
| 2006/0031883 | A1 | 2/2006 | Ellis et al. |
| 2008/0148310 | A1 * | 6/2008 | Strickland ....................... 725/30 |
| 2009/0249387 | A1 * | 10/2009 | Magdy et al. ................... 725/32 |
| 2009/0288131 | A1 * | 11/2009 | Kandekar et al. ............. 725/133 |
| 2011/0276993 | A1 * | 11/2011 | Ferguson ....................... 725/30 |

* cited by examiner

*Primary Examiner* — Oschta Montoya
(74) *Attorney, Agent, or Firm* — Chiesa Shahinian & Giantomasi PC

(57) ABSTRACT

A method for monitoring a monitored display monitors data to be output from a monitored display. The monitored data is analyzed to generate one or more content identifiers. The content identifiers are compared to a set of rules to determine if the monitored data should be blocked from being output or if an alert should be transmitted to a supervisor device. One or more supervisor devices may be used to respond to alerts and may also be used to control the output of the monitored display.

11 Claims, 3 Drawing Sheets

METHOD AND APPARATUS FOR DISTRIBUTED DISPLAY MONITORING

BACKGROUND

The present disclosure relates generally to display monitoring, and more particularly to monitoring program content to be output from a monitored display.

Television and other audio visual devices provide users with access to a variety of programs and information. Various controls have been developed to prevent certain viewers from viewing certain content. For example, the V-chip prevents the viewing of certain programs depending on the rating assigned to the program. A parent or supervisor can prevent a display from outputting certain content by designating an allowable upper rating limit. However, this causes the parent or supervisor to block or allow program content based on ratings that are determined by someone else. Thus, unless the parent's views concerning appropriate material are the same as the entity rating the programs, a viewer may be exposed to programs that the parent or supervisor would not typically allow. In addition, not all information is rated and some objectionable or inappropriate content may not be blocked by methods which rely on ratings alone.

A parent and child may watch programs together allowing the parent to change the channel or otherwise prevent the child from seeing some objectionable content. However, blocking content as it is being viewed may be too late as the content may have already affected the viewer. For example, blocking a movie after the child has viewed sexual or violent content is too late.

BRIEF SUMMARY

The present disclosure provides a method and apparatus for monitoring program content to be output by a monitored display. Embodiments of the present disclosure monitor and analyze data for output by a monitored display and content identifiers are generated based on the content the data represents. The content identifiers are compared to rules, such as blocking and alert rules, to determine if the content should be blocked from being output to the monitored display and if the supervisor should be alerted to the attempt to output specific content to the monitored display. In one embodiment, the data is buffered to prevent the output of content before it has been analyzed and/or approved by a supervisor. Alerts are transmitted to a supervisor device which may be used to display the content that triggered the alert and allow the supervisor to input an indication that the content should be blocked.

Blocking and alert rules may be entered by a supervisor or created based on the actions of a community to which the supervisor has identified him or herself as a member.

These and other advantages of the disclosure will be apparent to those of ordinary skill in the art by reference to the following detailed description and the accompanying drawings.

DETAILED DESCRIPTION

Figure 1:
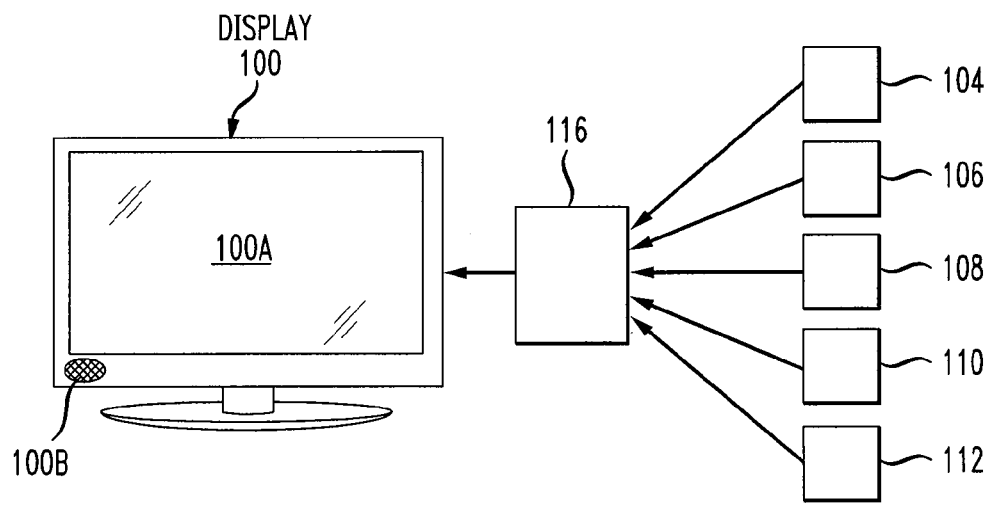
FIG. 1 shows an embodiment in which a variety of inputs are connected through a display monitoring device to a monitored display.
Figure 2:
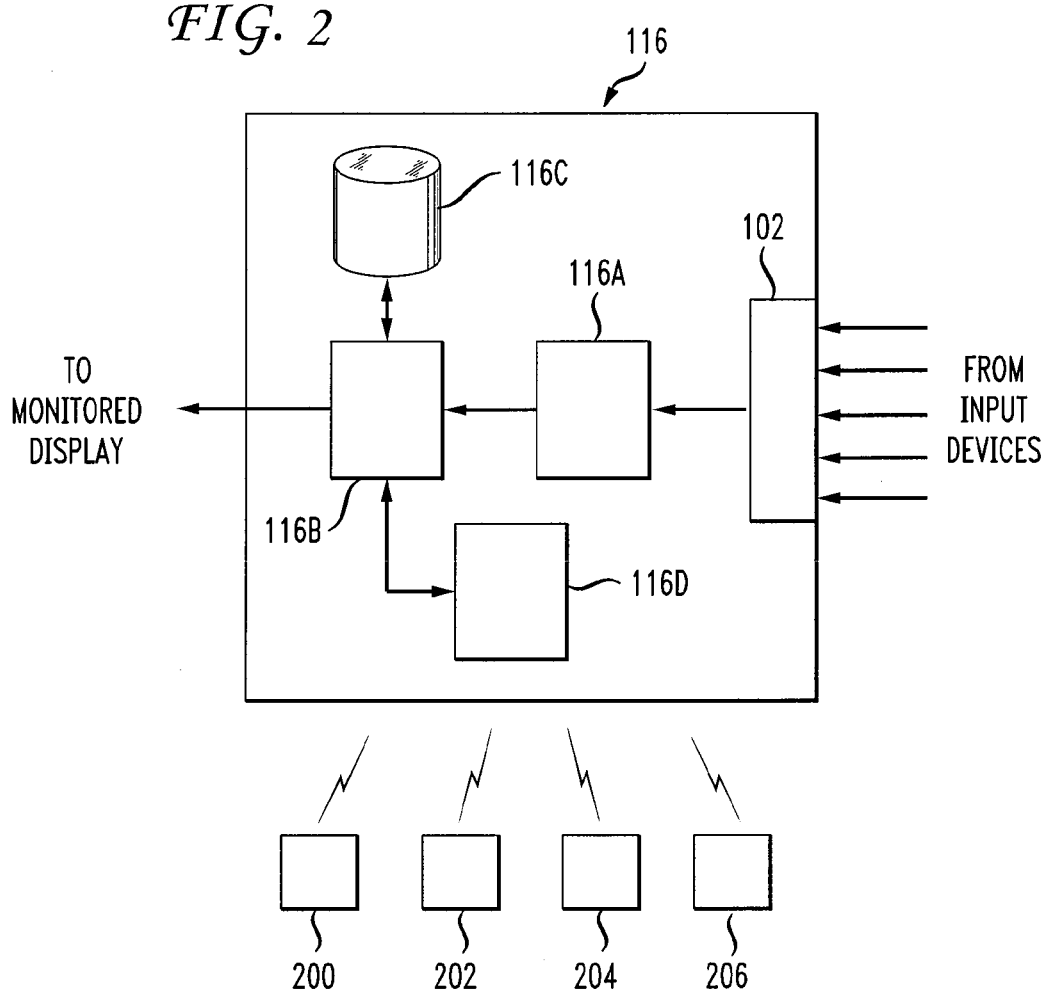
FIG. 2 shows a display monitoring device connected in series between input devices and a monitored display with the display monitoring device in communication with one or more supervisor devices.

FIGS. 1 and 2 illustrate a system for monitoring a monitored display according to one embodiment of the present disclosure. As illustrated in FIG. 1, a monitored display 100 comprises display component 100A and audio component 100B. For example, in one embodiment, display component 100A is a cathode ray tube, and audio component 100B is a single speaker. In other embodiments, display component 100A may be other image reproduction devices such an LCD display, plasma display, DLP display, etc. and audio component 100B may be one or more audio outputting devices such as one or more speakers or other electroacoustical transducers. It should be noted that, as used herein, output by the monitored display 100, includes audio and video, as well as any other output for presentation to a user of monitored display 100.

The output from monitored display 100 depends, in part, on the selection of an input connected to display monitoring device 116. Display monitoring device 116 is configured to accept video, image, and sound data from a variety of devices such as tuner 104 (e.g., cable box, digital cable box, satellite receiver, etc.), DVD player 106, VCR 108, video game console 110, or other input 112 (e.g., DVR, DVD-R, Blu-ray Player, camera, etc.) through a variety of connectors such as RCA jacks, various D-subminiature connectors, S-Video, coaxial, HDMI, etc. An output of display monitoring device 116 is connected to monitored display 100.

As illustrated in FIG. 2, display monitoring device 116 includes input array 102, buffer 116A, content identification and comparison module 116B, database 116C, and wireless transceiver 116D. Input array 102 provides for the connection of and subsequent selection from a plurality of input devices such as input devices 104-112. The use of input array 102 allows a user to connect multiple input devices and then select a specific input device to provide a signal thereby preventing the user from disconnecting one input device in order to connect a different input device. Input array 102 includes a switch or knob that allows a user to choose the data from one of the connected input devices to be output to buffer 116A. Buffer 116A is used to buffer data received from input array 102 and prevent data from being immediately transmitted to display 100. The size of buffer 116A depends on a variety of factors which may include the type of signals anticipated, the amount of data anticipated to be buffered, and the length of time before a supervisor responds to an alert (described below). Buffer 116A is in communication with content identification and comparison module 116B which is configured to analyze the data contained in buffer 116A (described below). Module 116B is in communication with database 116C which stores rules and data that may be used by the content identification and comparison module 116B in the analysis of the data to identify program content. Display monitoring device 116 is also in wireless communication with one or more supervisor devices such as display 200, computer 202, PDA 204, and cell phone 206 through wireless transceiver 116D. In other embodiments, display monitoring device 116 may communicate with supervisor devices using other wireless or wired communication methods. In one embodiment, display monitoring device 116 and one or more supervisor devices 200-206 are configured to allow a supervisor to view the program content currently being output by monitored display 100.

Figure 3:
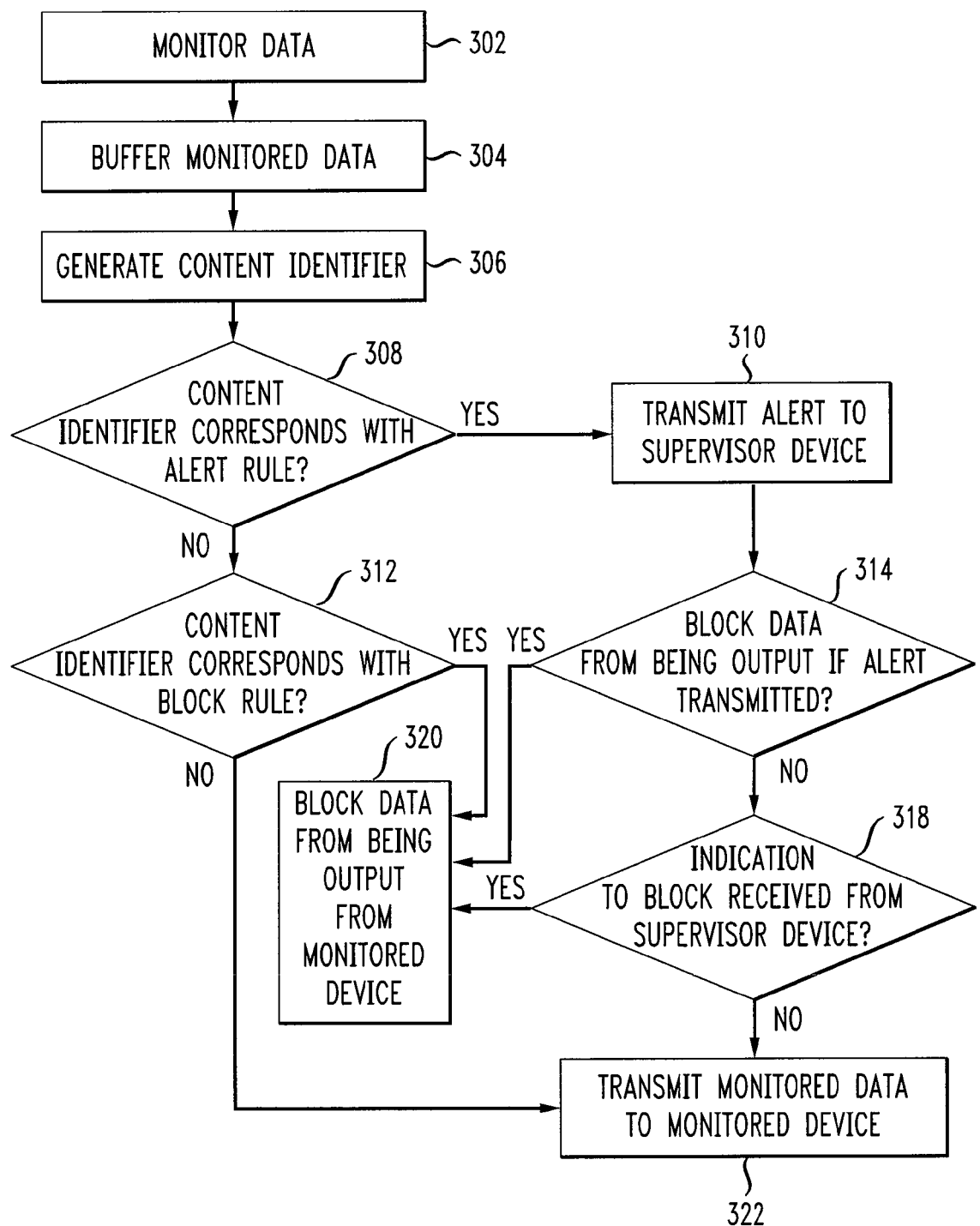
FIG. 3 is a flowchart depicting a method of monitoring a monitored display according to one embodiment of the present disclosure.

FIG. 3 shows a flow chart depicting a method of monitoring a monitored display according to one embodiment of the present disclosure. The method of FIG. 3 will be described in conjunction with the system illustrated in FIGS. 1 and 2.

At step 302, data transmitted from one of input devices 104-112 is monitored by display monitoring device 116, which is connected in series between monitored display 100 and input devices 104-112 (display monitoring device 116 receiving data from one of input devices 104-112 may also be referred to as intercepting data). Data from one of input devices 104-112 is output from input array 102 depending on the setting of input array 102 by a user, such as a supervisor or supervisee (i.e., the selection of a particular input to be output from monitored display 100 which may be selected via a knob or other input). At step 304, the monitored data is buffered by transmitting the data from input array 102 to buffer 116A (FIG. 2). It should be noted that step 304 is optional and, in some embodiments, monitored data is not buffered.

At step 306, a content identifier is generated based on the monitored data. Data stored in buffer 116A is accessed by content identification and comparison module 116B which generates one or more content identifiers based on data contained in buffer 116A. Content identifiers may be generated using a variety of methods, according to various embodiments of the present disclosure.

In one embodiment, a content identifier may be generated based on the input device from which the data is received. For example, a content identifier indicating that the input device is a video game console may be generated if the data originated from video game console 110.

Additional content identifiers may be generated based on the program content the data in buffer 116B represents which, in turn, may be determined in a variety of ways. In one embodiment, a content identifier is generated based on a rating assigned to a program or particular content represented by the buffered data. For example, data indicating the rating of a particular program may be transmitted from an input device along with the data containing the content of the program. The rating data can be received and used to identify the rating of the particular program. A content identifier representing the rating of the particular program or content is then generated.

In one embodiment, data received from tuner 104 and output from input array 102 may be analyzed by module 116B and one or more content identifiers are generated depending on the channel tuner 104 is tuned to, the current date and time, and a broadcast schedule. For example, the channel and the current date and time may be compared to a broadcast schedule stored in database 116C to determine what program the data is associated with. The broadcast schedule typically contains information for a plurality of programs including the title of the program, program timeslot, the rating, and, in some cases, a brief synopsis of the program. The information contained in the broadcast schedule may then be used to generate content identifiers based on program title, keywords contained in the synopsis, and other information contained in the broadcast schedule. In one embodiment, broadcast schedule information may be obtained from an electronic program guide ("EPG").

It should be noted that metadata is often transmitted in conjunction with data representing the actual program content and this metadata may also be used to generate content identifiers.

In one embodiment, the title of the program or other identifying information contained in the metadata may be used to determine the content to be displayed and, in turn, generate content identifiers. For example, the title of a program may be obtained and then used to locate additional information concerning a program. In one embodiment, after the title of a program is determined, module 116B searches database 116C for additional program information. Database 116C may be located locally in display monitoring device 116 as shown in FIG. 2 or remotely located and accessed via a network. In addition, other external databases may be accessed to provide information singly, or in combination with database 116C.

In other embodiments, other methods may be used to determine program content from analysis of the monitored data. In one embodiment, optical character recognition may be used to identify text to be displayed. Recognized text may then be compared to information contained in database 116C in display monitoring device 116. Text such as titles, names of actors and actresses, producers, movie companies, etc. to be displayed in a title sequence may be used to identify a program. After a program is identified, the methods described above may be used to generate content identifiers.

In one embodiment, program content may be determined by module 116B using image and sound analysis of images and sound data contained in buffer 116A. One or more captured images may be analyzed to determine the content of the images. In one embodiment, patterns determined in audio or visual data may be compared to patterns stored in database 116C to identify a specific program. In another embodiment, pattern matching may be used to identify people and objects contained in an image. The people and objects identified in the images may then be used to determine that the data represents a portion of a specific program. In an additional embodiment, the motion of the people or objects may be determined over several frames to infer what the series of images is displaying. For example, a boxing match may be identified by the detection of two figures moving their upper appendages toward one another repeatedly. Other scenarios may be detected based on pattern recognition and the movement of recognized people and objects over several frames. Colors may also be used, either alone or in conjunction with other methods, to determine the content to be displayed. For example, images containing sportsmen may be identified by the colors of their uniforms. Voice and/or speech recognition may be similarly used to determine the dialogue contained in data to be output from the monitored display. It should be noted that the preceding descriptions are exemplary and other methods of determining the content of audio visual material or other information to be displayed may be used as well. Any of the above methods, as well as other methods, may be used to determine program content which, in turn, may be used to generate content identifiers. In addition, separate modules in communication with module 116B may be used to analyze monitored data. For example, a separate voice recognition module in communication with module 116B may be used to analyze data associated with audio contained in the monitored data.

In one embodiment, the pattern matching described above or other content identification techniques may be used to determine that the portion of content analyzed is a portion of a program or known piece of content that may be listed in a database, such as database 116C. In one embodiment, the portion of content analyzed may be used to generate one or more content identifiers.

The content identifier generated in step 306 is then compared to a set of rules (described in greater detail below).

According to one embodiment, the rules may be stored in database 116C, but the present disclosure is not limited thereto, and the rules may be stored in other locations as well. At step 308, a content identifier is compared with a set of alert rules. If a content identifier is determined to correspond with an alert rule, the method proceeds to step 310. If the content identifier is determined not to correspond to an alert rule, then the method proceeds to step 312.

At step 310, when a content identifier is determined to correspond to an alert rule, an alert is transmitted to one or more supervisor devices 200-206. An alert is a message transmitted to one or more supervisor devices 200-206 indicating that the program content to be output by monitored display 100 has triggered an alert. The alert may be transmitted to a one or more supervisor devices depending on preferences set by a supervisor indicating how the supervisor would like to receive the alerts. The actual alert a supervisor views on a supervisor device varies in different embodiments. In one embodiment, the actual alert is a text indication that a supervisee is attempting to view data having a content identifier corresponding to an alert rule. In another embodiment, the supervisor may preview the data associated with the alert.

In one embodiment, a supervisor is provided with, in addition to the alert, an option for allowing monitored data to be transmitted to monitored display 100 to be output, or blocking the monitored data after an alert has been transmitted. At step 314, the default setting (also referred to as default status) the supervisor has previously entered is determined. If the supervisor has indicated that monitored data related to a content identifier that is determined to correspond with an alert rule should be blocked, then the monitored data is not transmitted to monitored display 100. If the supervisor has indicated that monitored data related to a content identifier that is determined to correspond to an alert rule should be not be blocked, then the monitored data is transmitted to monitored display 100.

An alert message received by a supervisor device also provides a supervisor with the option to override the default setting determined in step 314. At step 316, a response from the supervisor is received indicating whether the monitored data should be blocked. It should be noted that, in one embodiment, no response from a supervisor after a predetermined time period is considered a response from the supervisor selecting the default setting determined in step 314. At step 318 it is determined whether the supervisor's response indicates that the monitored data should be blocked or not blocked. If the default setting is to block monitored data and the supervisor's response indicates that the monitored data should be blocked, then the method proceeds to step 320 and the blocking of monitored data continues. If the default setting is to block monitored data and the supervisor's response indicates that the monitored data should not be blocked, then the method proceeds to step 322 and the monitored data is transmitted to monitored device 100. This allows the data to be temporarily blocked until the supervisor approves of the content. If the default setting is to not block monitored data and the supervisor's response indicates that the monitored data should not be blocked, then the method proceeds to step 322 and the monitored data is transmitted to monitored display 100. If the default setting is to not block monitored data and the supervisor's response indicates that the monitored data should be blocked, then the method proceeds to step 320 and the monitored data is not transmitted to monitored display 100.

As previously stated, at step 308, a content identifier is compared to a set of block rules (described in greater detail below). If a content identifier is determined not to correspond with an alert rule, then the method proceeds to step 312. At step 312 a content identifier is compared to a set of block rules. If a content identifier is determined to correspond with a block rule, then the method proceeds to step 320. If a content identifier is determined not to correspond with a block rule, then the method proceeds to step 322. At step 320, monitored data is blocked from being transmitted to and subsequently output by monitored display 100. At step 322, monitored data is transmitted to subsequently output by monitored device 100.

Steps 308 and the steps that follow it may be repeated for each content identifier. In one embodiment, steps 308 and the steps that follow are only performed until it is determined that the data to be output from monitored display 100 should be blocked. Once it is determined that the data should be blocked, additional content identifiers do not need to be compared with rules as it has already been determined that the program content is to be blocked.

Rules may be categorized into two types, specifically, alert rules and block rules. A content identifier matching an alert rule concerning the specific content identifier generates an alert that is transmitted to a supervisor device while a content identifier matching a blocking rule causes the related data to be blocked.

Alert rules can be defined by the supervisor to generate alerts based on one or more content identifiers. For example, if a supervisor wants to be alerted when any content or programs have a rating of PG (indicating that parental guidance is suggested) or higher, the rule may be defined to generate an alert for content rated parental guidance suggested or higher. The content identifiers related to ratings, and the associated alert rules, may be designated using existing rating systems such as those created by the Parents Television Council for television programs and the Motion Picture Association of America for films. Additional information may also be included with ratings such as content labels which provide an indication of why a program was given a particular rating. For example, a content label may indicate that a program contains violence, sexual situations, coarse or crude indecent language, or fantasy violence. Rules related to the content label may be generated or the content label may be incorporated into alert rules to further define the alert rules. For example, a supervisor may desire to receive an alert for programs having a "sexual situations" content label and create a rule to generate an alert for all programs with a content label of "sexual situations". Alternatively, a supervisor may create a rule to generate an alert for all programs having a rating of PG or higher with a "fantasy violence" content label. Alert rules may also relate to certain genres that are to generate alerts (e.g., science fiction or mystery). Alert rules may also pertain to certain words contained in a program summary, synopsis, or similar description. For example, alert rules which may indicate content having program descriptions containing words such as 'sex' or 'violence' should generate alerts. Alert rules can be generated to generate alerts for content having program descriptions (or program audio) containing any words entered by a supervisor.

Rules may be generated by a supervisor entering rules in a format that can be interpreted by module 116B of display monitoring device 116 through a user interface. In one embodiment, rules are created based on a supervisor's answers to various questions. For example, the supervisor may be presented with a statement such as "Generate an alert for all content having the following rating or higher:" followed by a list of ratings such as G, PG, PG-13, and NC-17.

Rules based on keywords may generated by a supervisor entering words into a text box. For example, a supervisor may be presented with a statement such as "Generate an alert for program content having the following words in the program description:" followed by a text box. A supervisor may enter words into the text box separated by delimiters such as spaces or semicolons. The words entered into the text box may then be used to generate rules that generate alerts if the program description contains a word identified by the supervisor. A supervisor may also select words from a list presented to the supervisor with the selected words then used to generate rules.

Rules based on genre may be generated by a supervisor selecting genres to generate alerts. For example, the supervisor may be presented with the statement "Generate an alert for program content related to the following genre(s):" followed by a list of genres such as science fiction, mystery, comedy, and horror.

Blocking rules are similar to alert rules with the exception being that content identifiers corresponding to blocking rules automatically block data from being transmitted to and output by monitored display 100 instead of generating alerts.

Although alert and blocking rules are typically entered by a supervisor, additional rules may be generated in a variety of ways. In one embodiment, the supervisor, through a supervisor device, may indicate that he or she is a member of a community. The community may be defined by geography, religion, interest, values or other common attribute. A supervisor can select to have rules generated based on the actions of other members of a particular community to which the supervisor has indicated he or she is a member. For example, if a majority of members of a particular community have blocked certain data from being displayed on monitored displays, a rule may be automatically generated for a particular supervisor, who has indicated membership in the particular community, to block that data as well.

Supervisors may monitor the content being output to the monitored display at any time. Supervisors may choose to block data from being displayed even though content identifiers related to the data do not correspond with a rule. Display monitoring device 116 may record and analyze the data that was blocked in order to generate a suggested rule to the supervisor. For example, if blocked data is analyzed and the content identifier "sexual situations" is generated, a rule to block data that generates that content identifier may be generated and suggested to the supervisor through a supervisor device. A supervisor may then be given the option to add or discard the new rule. In one embodiment, blocked data is analyzed using one or more of the methods described herein (e.g., pattern matching and voice/speech recognition).

Rules may be associated with the identity of a particular viewer or user. The identity of user viewing output from a monitored display may be determined in various ways such as providing each individual with a password that needs to be entered before monitored display 100 can be used. Other identification methods such as facial recognition of an image obtained using a camera connected to display monitoring device 116 may be used as well. After an individual has been identified, the set of rules associated with the identified individual may be used to monitor the intended output from monitored display 100. Procedures for determining which rules to apply when more than one individual is within viewing range of monitored display 100 may be defined as well. For example, if an older child and a younger child are within viewing range of monitored display 100, the rules that apply to the younger child may be applied instead of the rules associated with the older child or vice versa depending on how the supervisor has indicated the situation should be addressed.

Monitored display 100 may output an indication that the requested data has been blocked or that an alert has been sent to a supervisor. Alternatively, monitored display 100 may provide no indication that the requested data has been blocked. In other embodiments, predefined messages such as "No video games allowed from 8 am to 6 pm" may be output from monitored display 100 in lieu of blocked data. The supervisor may also enter a personal message such as "Lets watch this together Friday" through one of supervisor devices 200-204 to be displayed in lieu of blocked data.

The supervisor may also be provided with additional control over the output of monitored display 100 using one of supervisor devices 200-204 such as the ability to remotely change the channel displayed or other output from monitored display 100 via wireless transceiver 116D.

Multiple monitored displays 100 may be supervised by a single supervisor through one or more supervisor devices. A single monitored display 100 may be controlled by more than one supervisor and associated supervisor devices. For example, both of a child's parents may be configured to communicate with display monitoring device 116.

Monitoring may occur at one or more locations in a content delivery network including one or more service provider locations. In one embodiment, data to be output from a monitored display may be monitored at a service provider upstream of a particular monitored display using techniques described herein. In one embodiment, a supervisee's monitored display associated with a set top box is monitored at a central location from which content is being transmitted to the set top box. Content identifiers are generated using one or more techniques described herein and then compared to alert and blocking rules. Alerts, in one embodiment, are transmitted to one or more supervisor devices, which may include a set top box and display associated with the supervisor.

Supervisor devices may be configured in a variety of ways. For example, a display, such as a television, may be used as a supervisor device and configured to display alerts and a summary of what has been output or attempted to be output from a monitored display. The supervisor device may be configured to output a program the supervisor wants to view and provide a summary of the operation of the monitored display during commercial breaks. A supervisor device may also be used to view the current output of the monitored display at any time even with no alerts or blocking. The current output of one or more monitored displays may be shown on the supervisor device using picture in picture functionality.

Additional embodiments may include other features such as recording the data output from the monitored display for review by a supervisor. A supervisor may have the option to record all data output from the monitored display, a portion of the data, a summary of the data, or a periodic sampling of the data.

In one embodiment, monitoring can be triggered by in-band or out of band signals (i.e., triggering limited to a given time window (or multiple windows) during the day or when specific metadata, either present in the content itself or extracted automatically, is detected.)

In the embodiments described above, monitored data is either transmitted to monitored display 100 or not transmitted. In other embodiments the monitored data may be modified to generate an edited version of the monitored data for output by monitored display 100. For example, certain portions of sound data representing expletives, vulgarities, or content objectionable to a supervisor may be identified and blocked from being output by monitored display 100. The monitored data representing the objectionable sound content may also be replaced with a bleep or other sound. Similarly, monitored data representing objectionable image content may be altered to block, black out, pixilate or otherwise mask the objectionable image.

Figure 4:
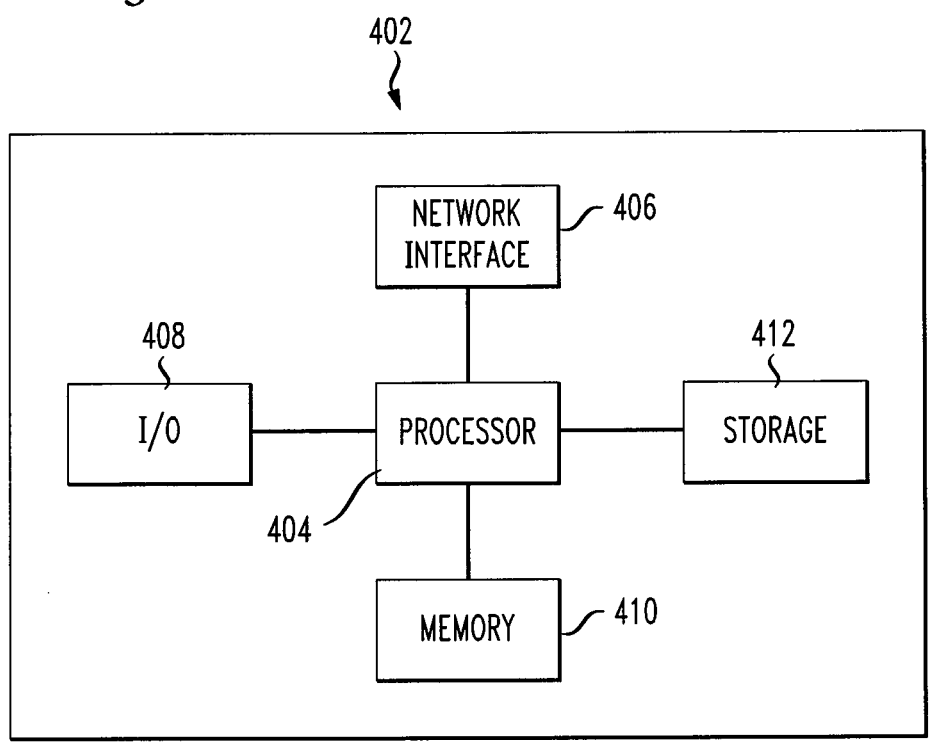
FIG. 4 is a high-level block diagram of a computer that may be used to implement the display monitoring device and supervisor device.

Display monitoring device 116 and supervisor devices 200-204 may be implemented using a computer. A high-level block diagram of such a computer is illustrated in FIG. 4. Computer 402 contains a processor 404 which controls the overall operation of the computer 402 by executing computer program instructions which define such operation. The computer program instructions may be stored in a storage device 412, or other computer readable medium (e.g., magnetic disk, CD ROM, etc.), and loaded into memory 410 when execution of the computer program instructions is desired. Thus, the method steps of FIG. 3 can be defined by the computer program instructions stored in the memory 410 and/or storage 412 and controlled by the processor 404 executing the computer program instructions. For example, the computer program instructions can be implemented as computer executable code programmed by one skilled in the art to perform an algorithm defined by the method steps of FIG. 3. Accordingly, by executing the computer program instructions, the processor 404 executes an algorithm defined by the method steps of FIG. 3. The computer 402 also includes one or more network interfaces 406 for communicating with other devices via a network. The computer 402 also includes input/output devices 408 that enable user interaction with the computer 402 (e.g., display, keyboard, mouse, speakers, buttons, etc.) One skilled in the art will recognize that an implementation of an actual computer could contain other components as well, and that FIG. 4 is a high level representation of some of the components of such a computer for illustrative purposes.

The foregoing Detailed Description is to be understood as being in every respect illustrative and exemplary, but not restrictive, and the scope of the general inventive concept disclosed herein is not to be determined from the Detailed Description, but rather from the claims as interpreted according to the full breadth permitted by the patent laws. It is to be understood that the embodiments shown and described herein are only illustrative of the principles of the general inventive concept and that various modifications may be implemented by those skilled in the art without departing from the scope and spirit of the general inventive concept. Those skilled in the art could implement various other feature combinations without departing from the scope and spirit of the general inventive concept.

The invention claimed is:

1. A method for monitoring output of a monitored display, comprising:
   determining an identity of a user viewing the monitored display via facial recognition using an image obtained via a camera connected to the monitored display;
   buffering data in a memory buffer to generate buffered data, the data comprising audio and video to be output by the monitored display;
   monitoring the buffered data;
   generating, at a display monitoring device, a content identifier based on information separate from the buffered data and located using program identifying information contained in the buffered data;
   comparing the content identifier to a set of rules associated with the identity of the user viewing the monitored display;
   transmitting an alert and a preview comprising the audio and the video associated with the alert to a supervisor device in response to the content identifier corresponding to an alert rule of the set of rules, a first supervisor associated with the supervisor device;
   generating an edited version of the buffered data for output by the monitored display, the edited version of the buffered data edited to remove sound data and image content identified by the first supervisor as objectionable; and
   displaying the edited version of the buffered data in response to input from the first supervisor,
   wherein one rule of the set of rules is generated based on a rule used by a second supervisor in a group of supervisors in which the first supervisor is a member and the buffering data continues until a response to the alert is received.

2. The method of claim 1, further comprising:
   blocking the data comprising audio and video to be output by the monitored display in response to the content identifier corresponding to a block rule of the set of rules.

3. The method of claim 1 wherein one rule of the set of rules is based on a rating associated with the data comprising audio and video to be output by the monitored display.

4. The method of claim 1, wherein one rule of the set of rules is based on a genre associated with the data comprising audio and video to be output by the monitored display.

5. The method of claim 1, further comprising:
   receiving input from the supervisor device indicating whether to block the data comprising audio and video to be output by the monitored display.

6. The method of claim 1, further comprising:
   blocking the data comprising audio and video to be output by the monitored display in response to the content identifier corresponding to an alert rule.

7. The method of claim 1, wherein the generating, at a display monitoring device, a content identifier based on the data comprises generating a plurality of content identifiers based on the data.

8. An apparatus for monitoring output of a monitored display comprising:
   a processor;
   a memory to store computer program instructions, the computer program instructions when executed on the processor cause the processor to perform operations comprising:
   determining an identity of a user viewing the monitored display via facial recognition using an image obtained via a camera connected to the monitored display;
   buffering data in a memory buffer to generate buffered data, the data comprising audio and video to be output by the monitored display;
   monitoring the buffered data;
   generating a content identifier based on information separate from the buffered data and located using program identifying information contained in the buffered data;
   comparing the content identifier to a set of rules associated with the identity of the user viewing the monitored display;
   transmitting an alert and a preview comprising the audio and the video associated with the alert to a supervisor device in response to the content identifier corresponding to an alert rule of the set of rules, a first supervisor associated with the supervisor device;
   generating an edited version of the buffered data for output by the monitored display, the edited version of the buffered data edited to remove sound data and image content identified by the first supervisor as objectionable; and
   displaying the edited version of the buffered data in response to input from the first supervisor,
   wherein one rule of the set of rules is generated based on a rule used by a second supervisor in a group of supervisors in which the first supervisor is a member and the buffering data continues until a response to the alert is received.

9. The apparatus of claim 8, the operations further comprising:
blocking the data comprising audio and video to be output from the monitored display in response to the content identifier corresponding to a block rule of the set of rules.

10. A non-transitory computer readable medium storing computer program instructions for monitoring output of a monitored display, which, when executed on a processor, cause the processor to perform operations comprising:
determining an identity of a user viewing the monitored display via facial recognition using an image obtained via a camera connected to the monitored display;
buffering data in a memory buffer to generate buffered data, the data comprising audio and video to be output by the monitored display;
monitoring the buffered data;
generating a content identifier based on information separate from the buffered data and located using program identifying information contained in the buffered data;
comparing the content identifier to a set of rules associated with the identity of the user viewing the monitored display;
transmitting an alert and a preview comprising the audio and the video associated with the alert to a supervisor device in response to the content identifier corresponding to an alert rule of the set of rules, a first supervisor associated with the supervisor device;
generating an edited version of the buffered data for output by the monitored display, the edited version of the buffered data edited to remove sound data and image content identified by the first supervisor as objectionable; and
displaying the edited version of the buffered data in response to input from the first supervisor,
wherein one rule of the set of rules is generated based on a rule used by a second supervisor in a group of supervisors in which the first supervisor is a member and the buffering data continues until a response to the alert is received.

11. The computer readable medium of claim 10, the operations further comprising:
blocking the data comprising audio and video to be output from the monitored display in response to the content identifier corresponding to a block rule of the set of rules.

* * * * *